US010173616B2

(12) United States Patent
Adler et al.

(10) Patent No.: US 10,173,616 B2
(45) Date of Patent: Jan. 8, 2019

(54) COMPRESSED AIR SYSTEM FOR A MOTOR VEHICLE

(71) Applicant: KNORR-BREMSE SYSTEME FUER NUTZFAHRZEUGE GMBH, Munich (DE)

(72) Inventors: Tamas Adler, Budapest (HU); Huba Nemeth, Budapest (HU)

(73) Assignee: Knorr-Bremse Systeme Fuer Nutzfahrzeuge GmbH, Munich (DE)

( * ) Notice: Subject to any disclaimer, the term of this patent is extended or adjusted under 35 U.S.C. 154(b) by 78 days.

(21) Appl. No.: 15/521,525

(22) PCT Filed: Oct. 9, 2015

(86) PCT No.: PCT/EP2015/073457
§ 371 (c)(1),
(2) Date: Apr. 24, 2017

(87) PCT Pub. No.: WO2016/066406
PCT Pub. Date: May 6, 2016

(65) Prior Publication Data
US 2017/0305372 A1    Oct. 26, 2017

(30) Foreign Application Priority Data
Oct. 30, 2014    (EP) .................................... 14190991

(51) Int. Cl.
*B60R 16/08*        (2006.01)
*B60T 13/66*        (2006.01)
(Continued)

(52) U.S. Cl.
CPC ............ *B60R 16/08* (2013.01); *B60T 13/662* (2013.01); *B60T 13/683* (2013.01); *B60T 17/02* (2013.01);
(Continued)

(58) Field of Classification Search
CPC ............ B60G 2600/73; B60G 17/0155; B60G 17/016; B60G 17/0182; B60G 17/019; B60G 17/0195
See application file for complete search history.

(56) References Cited

U.S. PATENT DOCUMENTS 8,727,064 B2 *  5/2014  Tai ........................... B60K 6/12
                                                    180/302
9,145,893 B2 *  9/2015  Hamdan ................. F04C 28/06
(Continued)

FOREIGN PATENT DOCUMENTS

DE    102008006860 A1    8/2009
EP        0469615 A1    2/1992
EP        2708429 A1    3/2014

OTHER PUBLICATIONS

International Search Report dated Mar. 11, 2016, of the corresponding International Application PCT/EP2015/073457 filed Oct. 9, 2015.

*Primary Examiner* — Redhwan K Mawari
(74) *Attorney, Agent, or Firm* — Gerard Messina

(57) ABSTRACT

A compressed air system for a motor vehicle with an air supply system, including: an electric drive motor, which can be controlled for variable speed, an air compressor coupled to be driven by the electric drive motor, an electric power supply for supplying electric power to the electric drive motor, at least one air reservoir connected with the air compressor to receive air from the air compressor, an air utilization system connected to the at least one air reservoir to receive air from the at least one air reservoir, a controller to control the speed of the electric drive motor. The controller controls the electric drive motor to determine the speed of the electric drive motor so that during filling of the air reservoir, when the pressure level in the air reservoir passes a setpoint that is between a minimum level and a
(Continued)

higher cut off pressure level, the controller changes the compressor speed so that specific power consumption per unit mass of air compressed is decreased.

21 Claims, 17 Drawing Sheets

(51) Int. Cl.
*B60T 13/68* (2006.01)
*B60T 17/02* (2006.01)
*F04B 49/20* (2006.01)
*B60G 11/26* (2006.01)
*B60N 2/52* (2006.01)
*B60T 13/26* (2006.01)

(52) U.S. Cl.
CPC .............. *F04B 49/20* (2013.01); *B60G 11/26* (2013.01); *B60N 2/525* (2013.01); *B60T 13/261* (2013.01); *B60Y 2300/1886* (2013.01)

(56) References Cited

U.S. PATENT DOCUMENTS

| | | | |
|---|---|---|---|
| 9,206,793 B2* | 12/2015 | Lee | F04B 17/05 |
| 9,256,576 B2* | 2/2016 | Gibson | B60G 99/00 |
| 9,272,595 B2* | 3/2016 | Hayes | B60G 17/0155 |
| 9,302,682 B2* | 4/2016 | Graab | B61C 17/00 |
| 2009/0254246 A1* | 10/2009 | Yang | B60T 17/02 |
| | | | 701/36 |
| 2017/0305372 A1* | 10/2017 | Adler | B60T 13/662 |

\* cited by examiner

COMPRESSED AIR SYSTEM FOR A MOTOR VEHICLE

FIELD OF THE INVENTION

The present invention relates to a compressed air system for a motor vehicle with an air supply system, particularly for use in commercial road vehicles.

BACKGROUND INFORMATION

Electrically driven compressors of the above-mentioned type are discussed, for example in US 2009/0254246 A1. As discussed there, an internal combustion engine drives a DC-generator to charge a battery which is connected to the electric drive motor of the compressor. The compressor is connected through an air treatment unit with an air reservoir. An air system controller controls the electric drive motor of the compressor.

If the air pressure in the air system reservoir is less than a set minimum value, the air system controller starts the motor and air compressor to charge the air reservoir, running the motor at higher speeds. As pressure increases in the air reservoir, motor speed is held constant or ramped down. When the pressure in the air reservoir increases to a set maximum value, the air system controller sets the drive motor and the compressor to shut off which stops the air charging operation.

Further, an operation of an air brake system stops the action of the drive motor and the compressor, to save energy when the air brake system is discharging air to stop the vehicle.

Also, the temperature of the compressor can be considered to control the speed of drive motor of the compressor.

Thus, the speed of the drive motor of the compressor is variable based upon the pressure in the air system reservoir and upon certain operation parameters of the vehicle.

SUMMARY OF THE INVENTION

An object of the present invention is to decrease the power consumption of the drive motor of the compressor, so that fuel can be saved and emissions decreased.

This object may be solved by the features according to the descriptions herein

The present invention refers to a compressed air system for a motor vehicle with an air supply system, comprising:
 an electric drive motor, which can be controlled for variable speed,
 an air compressor coupled to be driven by the electric drive motor,
 an electric power supply for supplying electric power to the electric drive motor,
 at least one air reservoir connected with the air compressor to receive air from the air compressor,
 an air utilization system connected to the at least one air reservoir to receive air from the at least one air reservoir, and
 a controller to control the speed of the electric drive motor.

The controller controls the electric drive motor to determine the speed of the electric drive motor depending upon at least one signal out of the following signals:
 A signal representing the activation status of an accelerator pedal of the vehicle,
 a signal representing the speed of the vehicle,
 a signal representing the temperature of the power supply,
 a signal representing the temperature of the electric drive motor,
 a signal representing the wetness level of the air compressed by the air compressor,
 a signal representing the load of the air compressor,
 a signal representing the running time of the air compressor,
 a signal representing the status of the electric power supply.

In other words, the determination of the speed of the electric drive motor for driving the compressor depends upon signals representing the vehicle status like signals of a controller area network of the vehicle, accelerator pedal signals, brake pedal signals, vehicle speed signals, temperature signals of the electric power supply or power stage, temperature signals of the electric motor, upon signals describing the status of the compressed air system (pressure level, wetness level, compressor duty, compressor running time etc.), upon signals representing the status of the electric power supply (status of charge, status of function, status of availability) and the status of the electric power network (current, voltage).

The present invention is characterized in that during filling of the air reservoir 11, when the pressure level in the air reservoir 11 passes a setpoint (labeled $p_{cutin}$ in FIG. 17) that is between a minimum level and a higher cut off pressure level, the controller changes the compressor speed so that specific power consumption per unit mass of air compressed is decreased.

The minimum level (labeled $p_{cutin\_critical}$ in FIG. 17) is understood to be the level below which the pressure is not to remain for any extended period of time in order to guarantee a reliable operation of the air utilization system 300, especially of an air brake system 12.

The cut off pressure level (labeled $p_{cutoff}$ in FIG. 17) is understood to be the level at which the air reservoir 11 contains the amount of energy that it is meant to hold for an extended period of time. This level is below the design limit of the air reservoir 11. It can be exceeded during overrun operation until the pressure reaches a second cut off pressure level (labeled $p_{cutoff\_overrun}$ in FIG. 17), to store excess energy in the system for later use by the air utilization system 300.

Thus, there are four different pressure intervals defined for the air reservoir 11:

1. If the pressure is below the minimum level $p_{cutin\_critical}$, the compressor may work at the highest possible speed so that the pressure climbs back above that minimum level as soon as possible.
2. If the pressure is between the minimum level $p_{cutin\_critical}$ and the setpoint $p_{cutin}$, the speed of the compressor is determined by the controller on the basis of the mentioned and claimed signals. The system can operate in air consumption mode, so that the amount of air consumed from the compressed air system 100 is refilled into it. The system can also operate in compressor duty mode to achieve a full refilling to the cut off pressure level $p_{cutoff}$ within the time frame $t_{ONLOAD\_LIMIT}$ during which the compressor may operate continuously.
3. If the pressure level is between the setpoint $p_{cutin}$ and the cut off pressure level $p_{cutoff}$, the compressor speed is changed so that specific power consumption per unit mass of air compressed is decreased. The compressor may work at its lowest specific power consumption work point. This work point may be altered to accommodate an on-load time limit $t_{ONLOAD\_LIMIT}$.

4. If the pressure level is above the cut off pressure level $p_{cutoff}$, during normal operation the compressor stops. When the engine is used as an engine brake and the combination of the engine and the alternator produces excess electrical energy, the amount of this excess electrical energy may be more than the available storage capacity of the vehicle battery at its current state of charge. In this case, the energy can be used by the compressor and stored in the air reservoir 11 in the form of compressed air for later use by the air utilization system 300. To this end, the compressor can operate either at its highest possible speed or at an optimal speed depending on the current state of charge of the vehicle battery.

The introduction of the new lower specific power consumption regime between the setpoint $p_{cutin}$ and the cut off pressure level $p_{cutoff}$ has several advantageous effects:

When a period of high air consumption gives way to a period of low air consumption, the task of refilling the air reservoir 11 to the desired cut off level is accomplished with a lower amount of electrical energy. Electrical energy is expensive in terms of fuel due to the poor efficiency of the internal combustion engine coupled with the good but limited efficiency of the alternator.

The compressor will have to be shut down and started again less frequently. An electric motor draws the highest current, and therefore sustains the highest wear, during start-up from a complete standstill; this is why most failures of motors occur at this time. Therefore, the life of the compressor is extended.

The capacity of the air reservoir 11 is optimally used to smooth out changes in the air consumption, so that the speed of the compressor has to be changed less frequently.

In an especially advantageous embodiment of the present invention, in at least one interval of pressure in the air reservoir 11, the compressor speed is regulated by the controller 7 so that a mass flow of air is delivered that is proportional to a ratio between
 1. the difference between the cut off pressure level and the actual pressure in the air reservoir 11 and
 2. the remaining time in the on load phase of the compressor.

This mode of operation ("compressor duty mode") will, if left undisturbed, bring the air reservoir 11 to the cut off pressure level $p_{cutoff}$ within the time limit of the current compressor duty cycle.

In a further especially advantageous embodiment of the present invention, while the pressure in the air reservoir 11 is above the minimum level $p_{cutin\_critical}$, the controller (7) transforms an increase in vehicle speed into an increase in compressor speed and/or transforms a decrease in vehicle speed into a decrease in compressor speed, according to a predefined function. For example, the compressor speed may be proportional to the vehicle speed, and/or a slowdown of the vehicle below a predefined speed may cause the compressor to shut down. The rationale behind this is that when the vehicle is slow, its motion as well as the engine produce less noise, so the noise of the compressor may be easily heard over those other noise sources; additionally, less air is needed to brake the vehicle to a stop from a lower speed. Likewise, when the vehicle speed increases, both the engine and the motion get louder so that the noise of the compressor may be lost in this racket; at the same time, a braking event requiring more air becomes more likely.

In a further especially advantageous embodiment of the present invention, the controller 7 optimizes the compressor speed so as to avoid at least one pre-set interval of compressor speeds. Such an interval may, for example, be placed around the resonance frequency of the compressor. Speeds in the interval may be disallowed by the controller 7, so that the controller never sets the compressor speed to a value inside the interval. Entry into the interval would then be barred by a solid "wall".

The compressor may also penalize those speeds in a merit function that it uses to rate compressor speeds, creating a strong but not necessarily insurmountable "repulsive force" counteracting entry of the compressor speed into the pre-set interval. This accommodates situations where a compressor speed inside the pre-set interval is an evil, but is a lesser evil than a speed outside the interval that is all in all far more unfavourable due to other reasons. The controller may, for example, employ Fuzzy Control to select compressor speeds, assigning a merit to compressor speed values using positive Fuzzy rules and designating the undesirable interval with negative Fuzzy rules.

When the controller changes the compressor speed from a first value on one side outside the preset interval to a second value on the other side outside the pre-set interval, the compressor may be set to cross the pre-set interval of speeds at its maximum slew rate. This avoids compressor speeds to be limited to values on one side of the pre-set interval only, while minimizing the amount of the time that the compressor is operating at an undesirable speed.

The pre-set interval can be set manually, but also automatically through a sweep of compressor speed and measurement of symptoms for resonance (e.g., noise or vibration).

The calculation of the speed of the electric drive motor of the compressor may be based on a function approximation and/or a look-up table for air flow-rate and power consumption maps of the compressor as function of compressor speed and back pressure, which are determined by a measurement and or vehicle tests or theoretical considerations.

With this, the power consumption of the electric drive motor of the compressor can be decreased.

The electric power supply, the controller and the electric drive motor may be connected by an electric power supply network, wherein the controller controls the electric drive motor to determine the speed of the electric drive motor depending upon a signal representing the status of the electric power supply network. Such a signal may be the voltage and/or the conducted current.

According to an exemplary embodiment, the speed of the electric drive motor is determined based upon at least one function and/or upon at least one look-up table, where at least one of the aforethe signals is an input variable for the at least one function and/or the least one look-up table.

Further, the speed of the electric drive motor can be determined based upon the air consumption of the compressed air system of the vehicle.

According to another aspect, the speed of the electric drive motor is controlled by the controller in a way, that, if the pressure level in the air reservoir is lower than a minimum level and if the power stage of the electric power supply reaches or exceeds a set power stage limit, than the electric drive motor is operated with its maximum speed until the pressure level in the air reservoir reaches a cut off pressure level, or if the pressure level in the air reservoir is below a set pressure limit and if the power stage of the electric power supply is below the set power stage limit, than the electric drive motor is operated with a speed between zero speed and its maximum speed, until the pressure level in the air reservoir reaches the cut off pressure level.

The speed of the electric drive motor may be controlled by the controller in a way, that, if the pressure in the air system reservoir is below a set pressure limit, than the electric drive motor is controlled to operate with a speed calculated to cover the actual air consumption of the compressed air system, until the pressure level in the air reservoir reaches a set cut off pressure level.

According to a further embodiment, the speed of the electric drive motor is controlled by the controller in a way, that, if the pressure in the air system reservoir is below a set pressure limit, than the electric drive motor is operated with a speed calculated to cover the current air consumption of the compressed air system, until the pressure level in the air reservoir reaches a cut off pressure level, which is higher than a normal cut off pressure level to store more energy in the compressed air system.

Further, the speed of the electric drive motor can be controlled by the controller in a way, that, if the power stage of the electric power supply is below a set power stage limit, or if the temperature of the electric drive motor exceeds a critical temperature limit, or if the actual speed of the electric drive motor is not equal to a demanded speed, than the electric drive motor will be stopped.

The electric drive motor may be controlled by the controller so that, if the compressor is switched offload and the actual speed of the electric drive motor of the compressor is higher than zero, the electric drive motor is operated in a generator mode to charge the electric power supply until a set or predetermined charge level of the electric power supply is reached.

According to another aspect, the electric drive motor is controlled by the controller in a way, that if an accelerator pedal of the drive engine of the vehicle is kicked down and the charge status of the electric power supply exceeds a set charge limit and the consumption of electric power is above a set consumption limit, than the electric drive motor of the compressor is controlled to operate with a calculated speed lower than its maximum speed until the pressure in the air system reservoir reaches a set cut off pressure level.

Further, the electric drive motor can be controlled by the controller in a way, that if the ambient temperature is below a set ambient temperature, the electric drive motor is controlled to operate with a set calculated speed until the pressure level in the air system reservoir reaches a cut off pressure level.

According to a embodiment, the electric drive motor is controlled by the controller in a way, that if the temperature of the electric drive motor is above a set temperature limit, a reduced first speed of the drive motor of the compressor is calculated, reducing the load of the electric drive motor, which then is controlled to operate with this first calculated speed, and if, additionally, the temperature of the electric power supply is above a set temperature limit, then, the first calculated speed of the electric drive motor is recalculated to a second calculated speed which is lower than first calculated speed and the electric drive motor is controlled to operate with the second calculated speed, until the pressure in air system reservoir reaches a set cut off pressure level.

Further, the electric drive motor can be controlled by the controller in a way, that if the electric drive motor is in an offload mode for a time period longer than a set or predefined time period, the electric drive motor is started and controlled to operate with a set or calculated speed until the pressure in the air system reservoir reaches a cut off pressure level.

According to another embodiment, the electric drive motor is controlled by the controller in a way, that if the wetness level in the air system reservoir is above a predefined or set wetness level limit, the electric drive motor of the compressor is stopped.

The electric drive motor may be controlled by the controller in a way, that if the ambient temperature is below a set or predefined temperature, the electric drive motor is controlled to start and run at a set or calculated speed until the pressure level in air system reservoir has reached a cut off pressure level.

The present invention will be best understood by reference to the following detailed description of an illustrative embodiment when read in conjunction the accompanying drawings.

DETAILED DESCRIPTION

Figure 1:
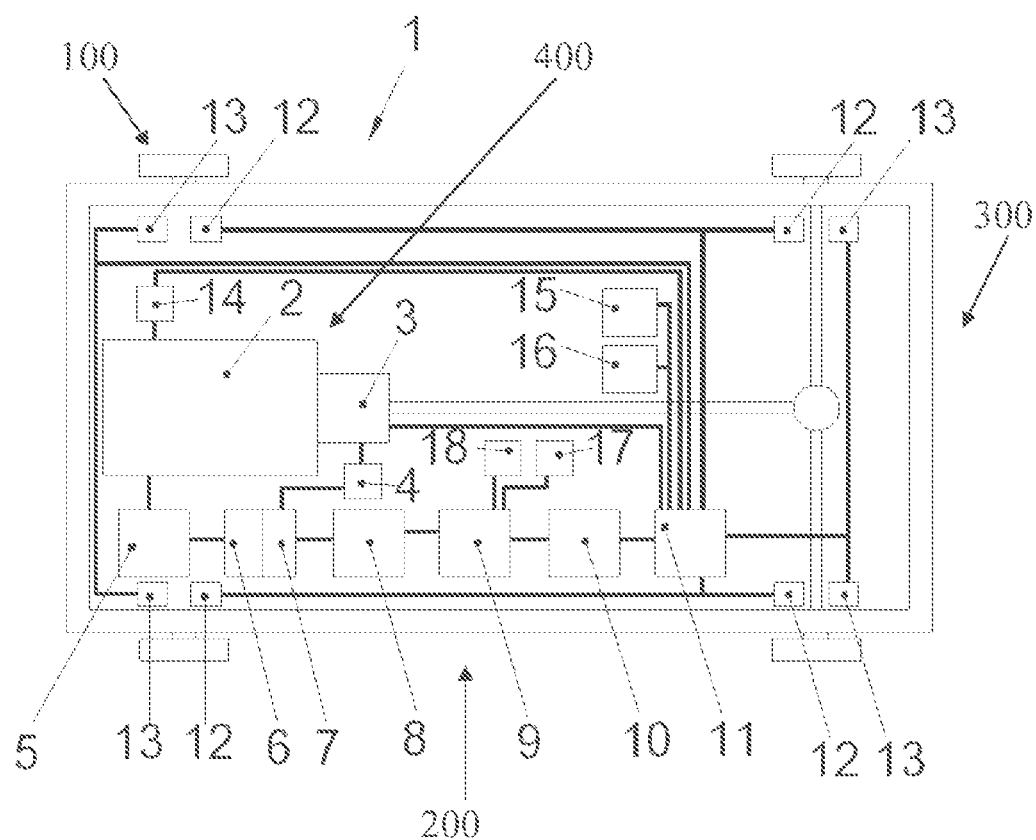
FIG. 1 is a schematic illustration of a vehicle chassis of a commercial vehicle with a compressed air system according to a preferred embodiment.

Referring now to the drawings and in particular to FIG. 1, a motor driven vehicle, particularly a motor driven commercial vehicle, which may be a vehicle with a conventional internal combustion engine only or vehicle with a hybrid diesel-electric engine 2, 4, has a chassis 1, on which an compressed air system 100 comprising an air supply system 200 and an air utilizing system 300 is mounted. According to a preferred embodiment, the commercial vehicle is driven by a drive line 400 comprising a hybrid diesel-electric engine 2, 4 and a transmission 3.

The air utilizing system 300 comprises air utilizing components that contribute to a consumption of air like an air brake system 12, an air suspension 13, a transmission 3, a door opening system 15, a driver seat suspension 16, a pneumatic booster system 14 and the like. The air brake system 12 of the commercial vehicle preferably comprises an active service brake, where the service brakes are activated by increasing the air pressure in service brake cylinders and where the service brake is released by decreasing the pressure in the service brake cylinders, and a passive parking brake, where the parking brake is activated by decreasing the air pressure in parking spring brake cylinders and where the parking brake is released by increasing the pressure in the parking spring brake cylinders to a level which equates to a parking brake release pressure.

Further mounted on the chassis is the driveline 400 of the vehicle comprising an internal combustion engine 2, and, according to the preferred embodiment, an electric motor 4 as the electric part of the hybrid diesel-electric engine 2, 4 as well as the transmission 3.

Figure 2:
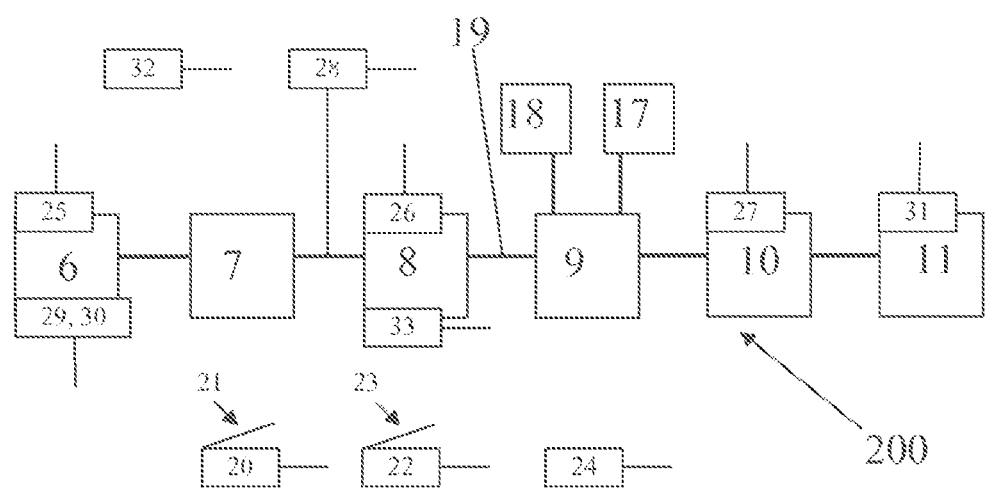
FIG. 2 is a schematic illustration of an air supply system of the compressed air system.

The air supply system 200 is illustrated separately in FIG. 2. It comprises an electric power supply 6, e.g. in Form of one or more batteries, an electronic control unit 7, with a microcomputer controlling an electric drive motor 8, variable in its speed, which drives a compressor 9, particularly its crankshaft. The compressor 9 may be a rotary screw air compressor, delivering compressed air to an air processing unit 10 which may include an air dryer for air regeneration. The air dryer 10 is connected with an system air reservoir 11 which may include one or more separate air reservoirs, particularly one separate air reservoir for each air circle of the air utilizing system 300 such as an air suspension air circle, several air brake circles, a door opening air circle etc.

The vehicle driveline 400 is not coupled with the crankshaft of the compressor 9, which means that the compressor 9 can not be driven directly by the internal combustion engine 2 or here, in case of a hybrid engine 2, 4 driven vehicle, directly by the electric motor 4 of the hybrid engine 2, 4. Rather, the compressor 9 is operated independently from the vehicle's driveline 400, as the air supply system 200 according to FIG. 2 is a standalone system.

The air system compressor 9 is driven by the electric drive motor 8 which is controlled by control unit 7. The electric power to actuate the control unit 7 as well as the electric drive motor 8 of the compressor 9 is delivered by the electric power supply 6. The electric power supply 6, particularly in form of a battery is charged here by a stand alone electric generator 5, which preferable is mechanically driven by and coupled with the internal combustion engine 2, as can be seen from FIG. 1.

Alternatively, the electric generator 5 could be also driven by the electric motor 4 of the hybrid engine 2, 4. Under another aspect, the electric power supply 6 of the air supply system 200 can be charged by the electric drive motor 8 of the compressor, when this electric drive motor 8 is operated in its generator mode.

The compressor 9 can cooperate with auxiliary systems such as a lubricating system 17 for lubricating moving parts of the compressor 9 and a cooling system 18 for cooling the compressor 9 under operation, if needed. Thus, the cooling system 18 serves as a device for cooling the compressor 9 and is controlled by the controller 7 to be preferably activated, when the temperature of the compressor 9 exceeds a critical temperature.

The electric power supply 6, the controller 7 and the electric drive motor 8 are connected by an electric power supply network 19 for conducting an electric current. Further, there is a signal line (not seen in FIG. 2) between the controller 7 and the electric drive motor 8 for transmitting control signals. This electric power supply network 19 also forming part of the air supply system 200.

Further, the controller 7 of the electric drive motor 8 receiving electric signals from several sensors, among which is a sensor 20 for generating a signal representing an activation status of an accelerator pedal 21 of the hybrid engine 2, 4 of the vehicle, a sensor 22 for generating a signal representing an activation status of a brake pedal 23 of the air brake system 12 of the vehicle, a speed sensor 24 for generating a signal representing the speed of the vehicle, a temperature sensor 25 for generating a signal representing the temperature of the power supply 6, a temperature sensor 26 for generating a signal representing the temperature of the electric drive motor 8, a wetness sensor 27 for generating a signal representing the wetness of the air compressed by the compressor and delivered to the air processing unit 10, a current sensor 28 for generating a signal representing the current present in the electric power network 19 and therefore also representing the load of the compressor 9, a current sensor 29 and/or a voltage sensor 30 for generating a signal representing the status of the electric power supply 6, a pressure sensor 31 for generating a signal representing the pressure in the air system reservoir 11, an ambient temperature sensor 32 for generating a signal representing the temperature of the ambient, a speed sensor 33 for generating a signal representing the rotational speed of the electric drive motor 8.

The aforementioned sensors are connected by electric signal lines with the controller 7, as indicated in FIG. 2, to feed controller 7 with respective signals.

Further, the controller 7 of the electric drive motor 8 has an internal clock, such that signals representing the running time of the air compressor 9 can be generated and evaluated.

Preferably, at least one of the aforementioned signals and data are delivered to the controller 7 of the electric drive motor 8 of the compressor to be used as a basis to control the speed of the electric drive motor 8 of the compressor 9. In other words, the determination or calculation of the speed of the electric drive motor 8 depends upon at least one of those signals.

Also, the total air consumption level of the compressed air system 100 can determine the speed of the electric drive motor 8 to target low power consumption of the electric power supply 6 of the vehicle 1, while maintaining the demand pressure of the compressed air system 100. The components that contribute to the air consumption of the compressed air system 100 are the components of the air utilizing system 300 as the air brake system 12, the air suspension 13, the transmission 3, the door opening system 15, the driver seat air suspension 16, the pneumatic booster system 14, the air processing unit 10. But also leakage or the regeneration process can influence the air consumption in the compressed air system 100.

In the following, several modes for operating the compressed air system 100, particularly the air supply system 200 are presented.

1. Air Consumption Mode

An observation of the air consumption of the compressed air system 100 is based on the mass balance of the compressed air system 100. The air consumption of the compressed air system 100 of the vehicle is calculated as follows:

$$\frac{dp}{dt} = \frac{R_{air} \cdot T_{amb}}{V_{system}} \cdot \left( \frac{dm_{comp}}{dt} \cdot w - \frac{dm_{cons}}{dt} \right) \Rightarrow$$

-continued $$\frac{dm_{cons}}{dt} = \frac{dm_{comp}}{dt} \cdot w - \frac{dp}{dt} \cdot \frac{V_{system}}{R_{air} \cdot T_{amb}}$$

where $\frac{dm_{cons}}{dt}$ is the total air consumption of the compressed air system, $\frac{dm_{comp}}{dt}$ is the air flow rate delivered by the compressor 9, $\frac{dp}{dt}$ is the pressure gradient of the compressed air system, w is the factor between air consumption and compressor delivery $V_{system}$ is the total volume of the compressed air system 100, $R_{air}$ is the specific gas constant of air, $T_{amb}$ is the ambient temperature.

Compressor flow-rate maps are known. To cover the consumption of the compressed air system 100 of the vehicle, the required speed of the drive motor 8 of the compressor 9 can be also calculated based on the flow-rate maps. Finally, the speed of the drive motor 8 can be calculated as a function of the air consumption and pressure level in the compressed air system 100.

The factor w between air consumption and compressor delivery is used to ensure that the compressor delivery will be higher than the air consumption, which equals rising pressure level in the air system.

Figure 15:
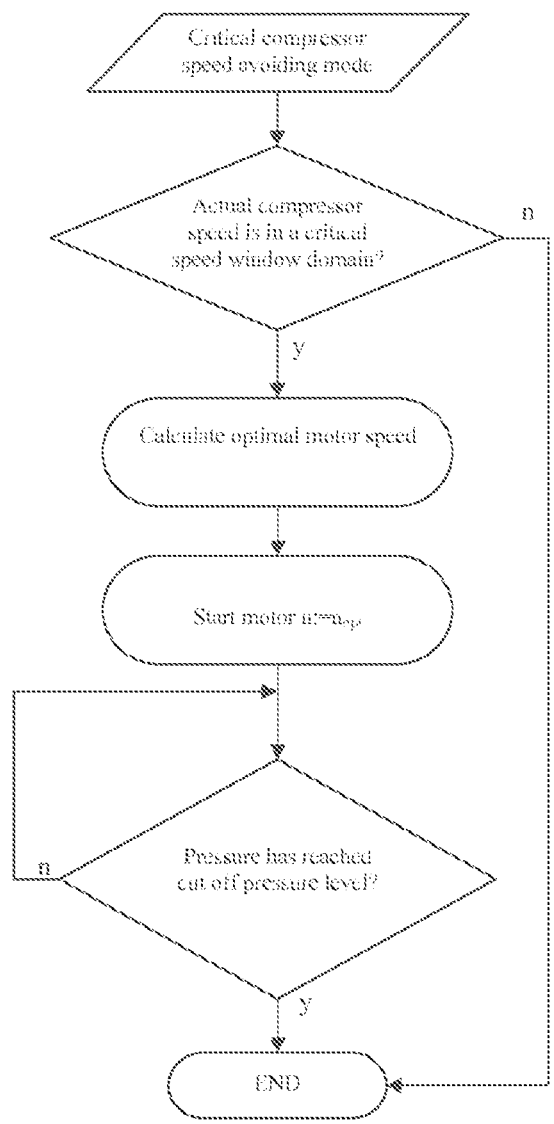
FIG. 15 is a flow chart illustrating critical speed avoidance mode.
Figure 16:
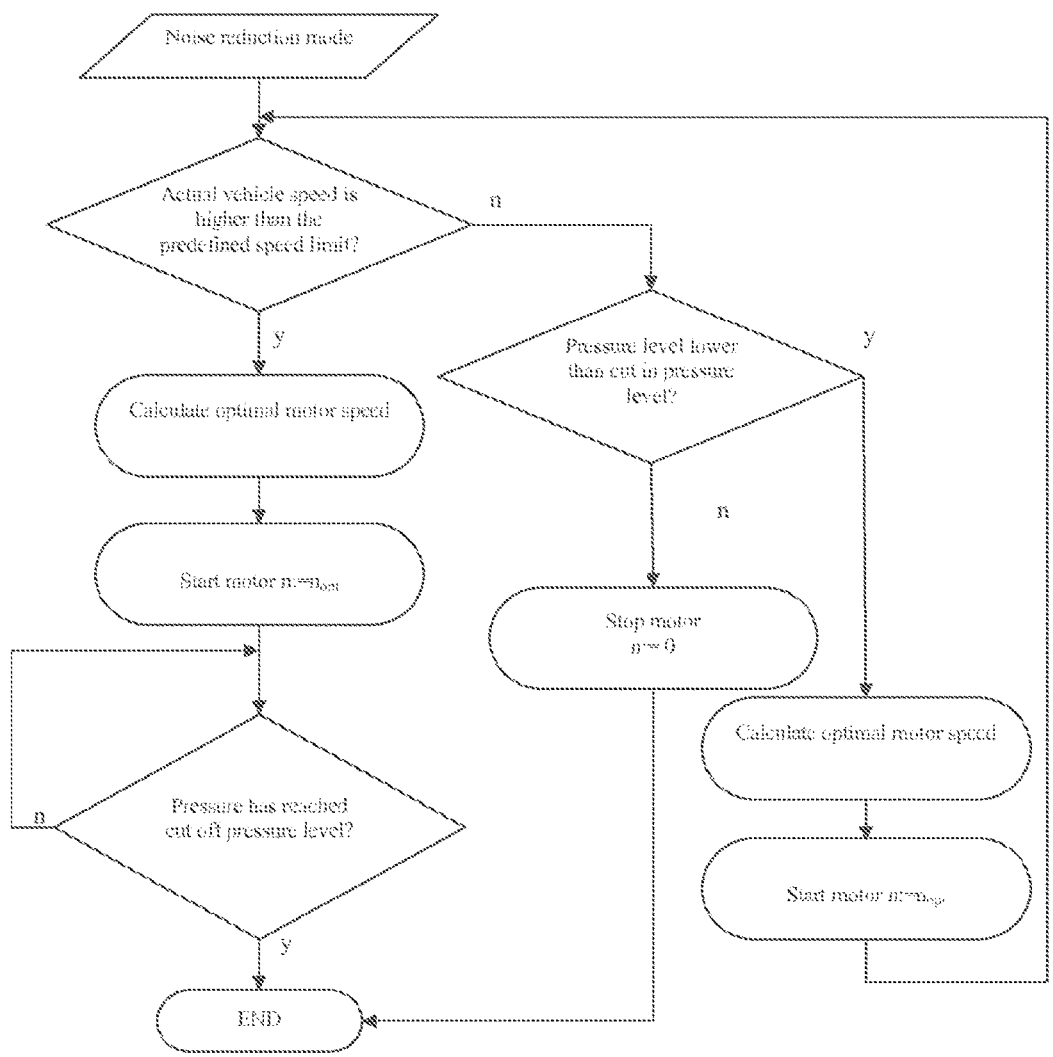
FIG. 16 is a flow chart illustrating noise management mode.
Figure 17:
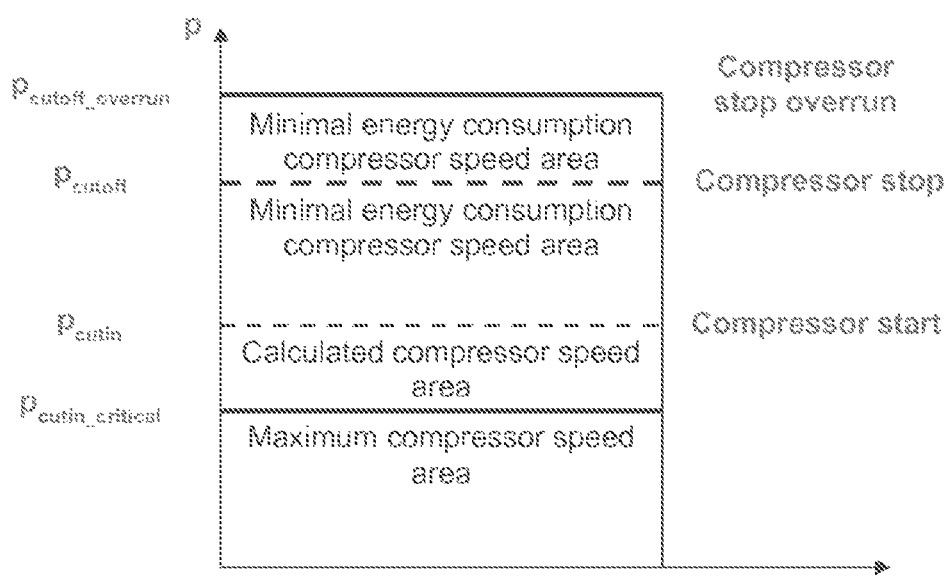
FIG. 17 illustrates operation in the four different reservoir pressure regimes.

The calculated compressor speed is used only in the pressure domain between the critical cut in pressure level and the normal cut in pressure level. If the pressure level in the compressed air system 100 is higher than the cut in pressure level, the compressor speed corresponding to the lowest specific power consumption will be set (Minimal energy consumption compressor speed). If the pressure level in the compressed air system 100 is lower than the critical cut in pressure, the maximum compressor speed will be set. See FIG. 15.

2. Start Up Filling Mode

Figure 3:
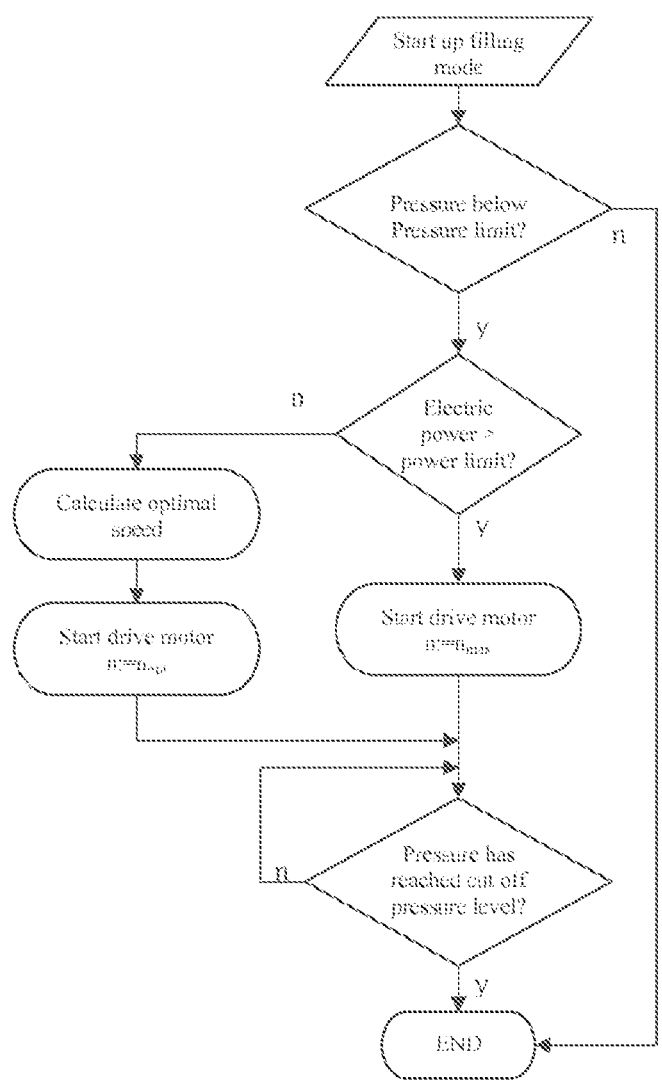
FIG. 3 is a flow chart illustrating a start up filling mode.

When starting the commercial vehicle, the pressure level in the air reservoir 11 is normally lower than a set minimum pressure level, particularly lower than the parking brake release pressure of the passive parking brake. If then, the battery charging level is higher than a predefined value, the start up filling mode can also be activated in case of a stopped Internal combustion engine 2. The start up filling mode is illustrated in FIG. 3.

The speed of the electric drive motor 8 is controlled by the controller 7 that, if the pressure level in the air reservoir 11 is below a set pressure limit and if the power status of the electric power supply 6 reaches or exceeds a set power status limit, than the electric drive motor 8 is operated with its maximum speed until the pressure level in the air reservoir 11 reaches a set cut off pressure level.

Alternatively, if the pressure level in the air reservoir 11 is below a set pressure limit and if the power status or charge status of the electric power supply 6 is below the set power status or charge limit, than the electric drive motor 8 is operated with a set speed between zero speed and its maximum speed, until the pressure level in the air reservoir 11 reaches the cut off pressure level.

3. Maximum Power Mode

Figure 4:
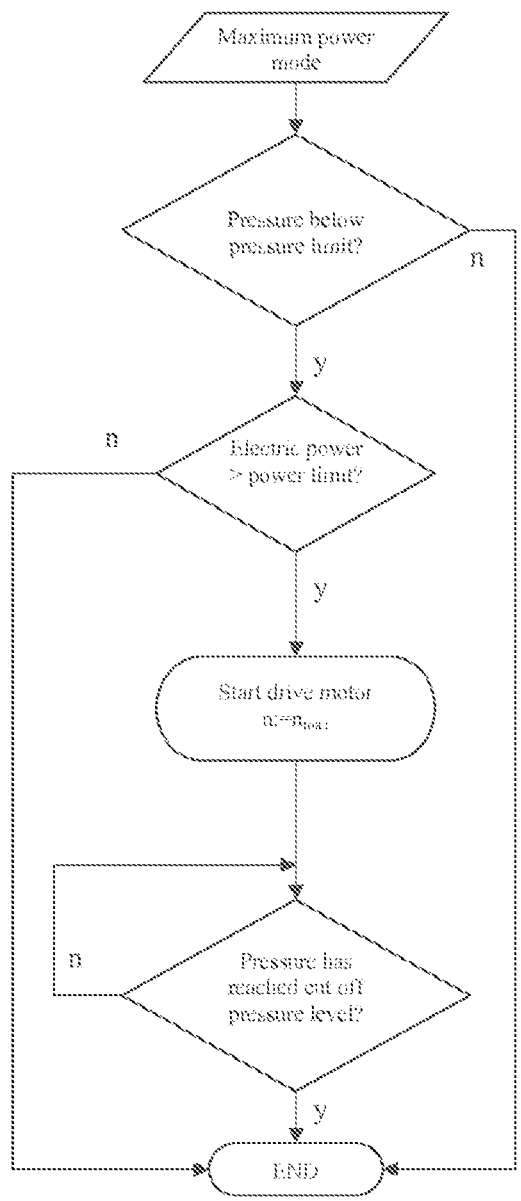
FIG. 4 is a flow chart illustrating a maximum power mode.

In case of low pressure level in the air system reservoir 11, the electric drive motor 8 of the compressor 9 is controlled to operate at its highest speed to cover high air consumption, if the internal combustion engine 2 is operating. The maximum power mode is illustrated in FIG. 4.

If the air system pressure level is below a set cut pressure level, and the battery and power stage 6 status is ok, then, the drive motor 8 of the compressor 9 is started an controlled to work at its maximum speed until pressure level in the air system reservoir reaches the set cut off pressure level.

4. Optimal Power Mode

Figure 5:
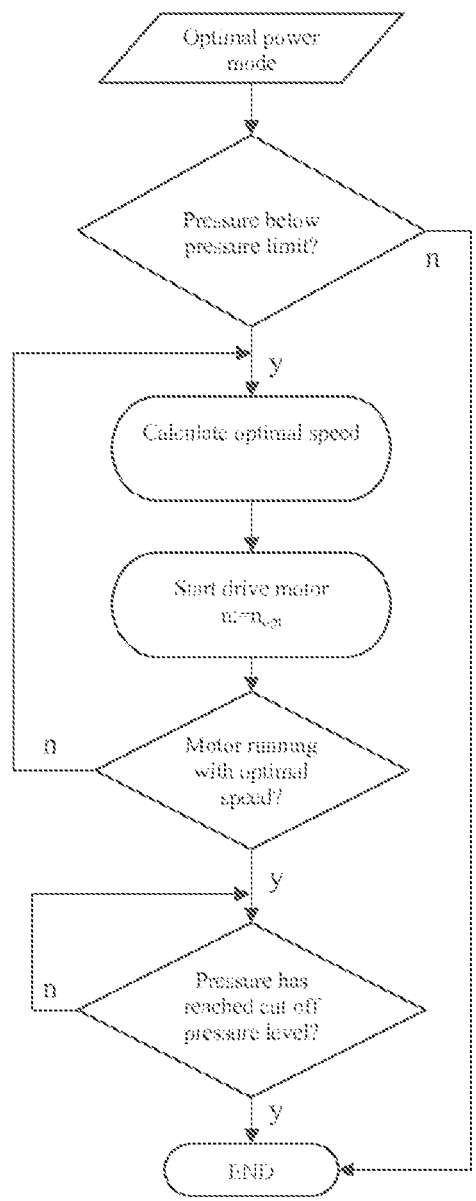
FIG. 5 is a flow chart illustrating an optimal power mode.

In case of low air consumption the electric drive motor 8 of the compressor 9 is controlled to be driven at a calculated rotational speed considering the highest efficiency to minimize the power consumption of the electric power supply 6, fuel consumption and to extend battery's lifetime. The optimal power mode is illustrated in FIG. 5.

The speed of the electric drive motor 8 is controlled by the controller 7 that, if the pressure in the air system reservoir 11 is below a set pressure limit, than the electric drive motor 8 is controlled to operate with a speed calculated to cover the actual air consumption, until the pressure level in the air reservoir 11 reaches a set or predetermined cut off pressure level.

5. Overrun Mode

Figure 6:
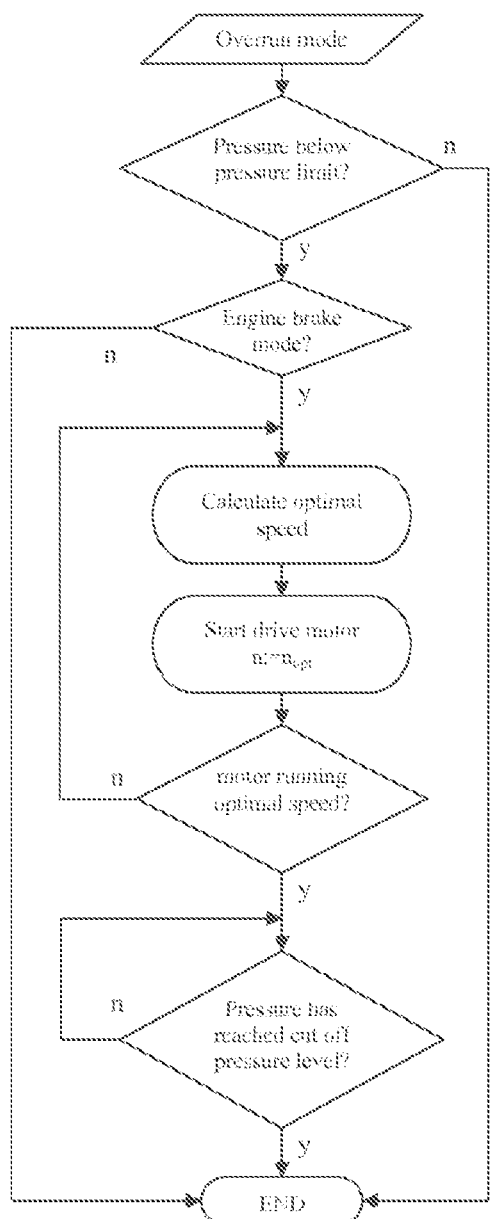
FIG. 6 is a flow chart illustrating an overrun mode.

In an engine brake mode, when the engine is used to produce a braking effect, e.g. for a retarder brake, the electric drive motor 8 of the compressor 9 is activated, if battery level is above a predefined value. In this case, the air system reservoir 11 can be overfilled above a set cut off pressure level to store more energy in the pneumatic system. The overrun mode is illustrated in FIG. 6.

If the pressure in air system reservoir 11 is below a set cut off pressure and if the drive engine 2 of the vehicle works in an engine brake mode, e.g. in a retarder mode, then the electric drive motor 8 of the compressor 9 is started and controlled to work at a calculated speed until the pressure in air system reservoir reaches the cut off pressure level of the overrun mode, which is higher than the normal cut off pressure level, to store more energy in the compressed air system 100.

6. Emergency Mode

Figure 7:
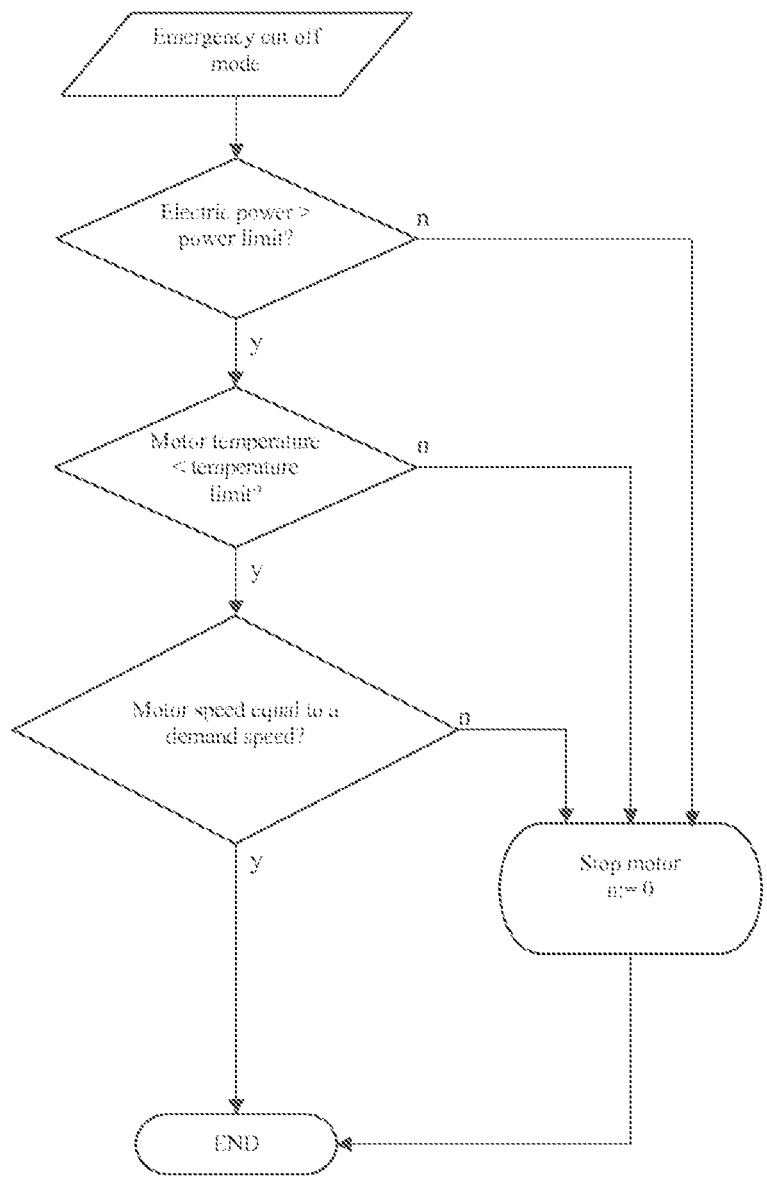
FIG. 7 is a flow chart illustrating an emergency mode.

The emergency mode covers a malfunction of the compressor 9 and/or of the electric drive motor 8 and/or of the electric power supply 6. If at least one of those malfunctions occurs or is detected, the electric drive motor 8 of the compressor 9 will be stopped. The emergency mode is illustrated in FIG. 7.

If the power or charge status of the electric power supply 6 is below a set power status or charge limit, or, if the temperature of the electric drive motor 8 exceeds a set critical temperature limit, or, if the actual speed of the electric drive motor 8 of the compressor 9 is not equal to a demanded speed, than the electric drive motor 8 of the compressor 9 will be stopped.

7. Compressor Braking Mode

Figure 8:
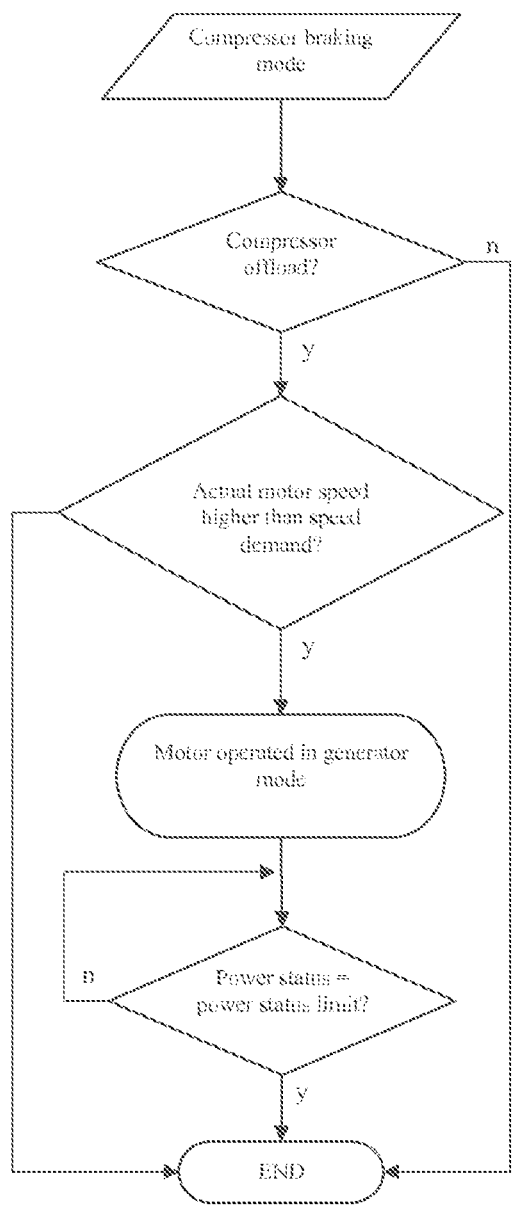
FIG. 8 is a flow chart illustrating a compressor braking mode.

When the compressor 9 is switched off or off load, the electric drive motor 8 is operated in or switched to a generator mode to charge the electric power supply 6 during the speed down of the electric drive motor 8 and of the coupled compressor 9. The electric energy obtained thereby is delivered by the electric power supply network 19 from the electric drive motor 8 to the electric power supply 6. This process is illustrated in FIG. 8.

If the compressor 9 is switched offload and the actual speed of the electric drive motor 8 of the compressor 9 is higher than an actual speed demand for the electric drive motor 8, which is zero in this case, the electric drive motor 8 is operated in or switched into a generator mode to charge the electric power supply 6 until a set or predetermined charge level the electric power supply 6 is reached.

8. Overtake Mode

Figure 9:
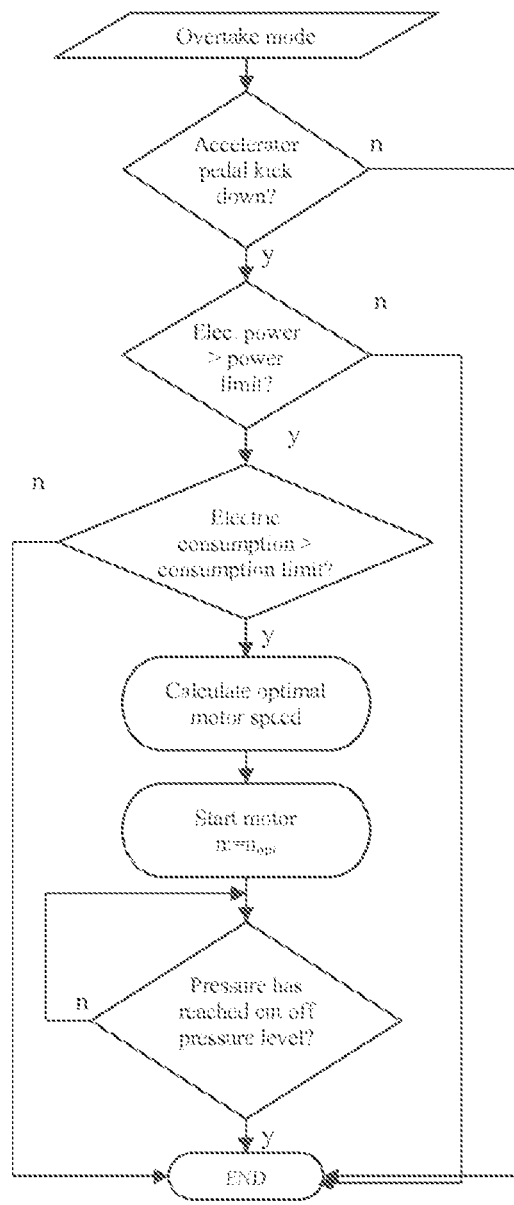
FIG. 9 is a flow chart illustrating an overtake mode.

If the driver initiates a high acceleration demand, e.g. in form of a kick down of he accelerator pedal 21, and the electric drive 4 of the vehicle is also activated, the electric drive motor 8 of the compressor 9 is turned off or speeded down considering the high demand for electric power to decrease the degradation of the electric power supply 6, if the pressure level in air system reservoir 11 is above a set pressure value. This process is illustrated in FIG. 9.

If the accelerator pedal 21 of the engine 2 is kicked down and the charge status of the electric power supply 6 exceeds a set charge limit and the consumption of electric power is above a consumption limit, than the electric drive motor 8 of the compressor 9 is controlled to operate with a calculated speed lower than the maximum speed until the pressure in the air system reservoir 11 reaches a set cut off pressure level. A parameter representing the consumption of electric power or energy may be the current conducted in the electric consumer circuit(s).

9. Cold Operation Mode

Figure 10:
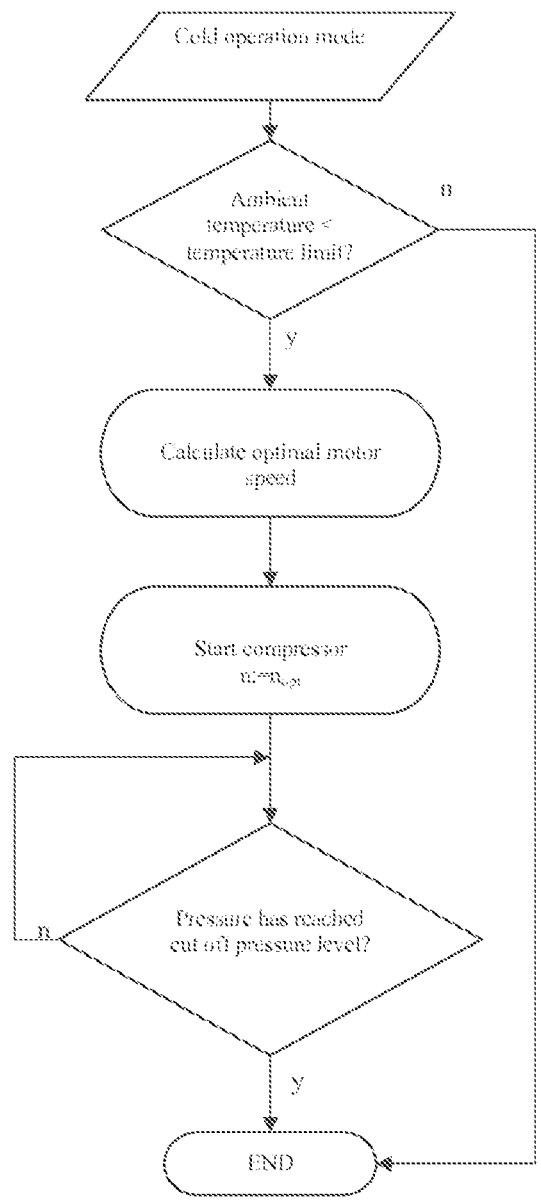
FIG. 10 is a flow chart illustrating a cold operation mode.

If the ambient temperature is below a set ambient temperature, a reduced speed of the electric drive motor 8 of the compressor 9 is applied if also the pressure level in the air system reservoir 11 is above a set pressure limit to conserve the electric energy of the electric power supply 6. This process is illustrated in FIG. 10.

If the ambient temperature is below a set ambient temperature, the electric drive motor 8 of the compressor 9 is started and controlled to operate with a set calculated speed until the pressure level in air system reservoir 11 reaches a cut off pressure level.

10. Load Reducing Mode

Figure 11:
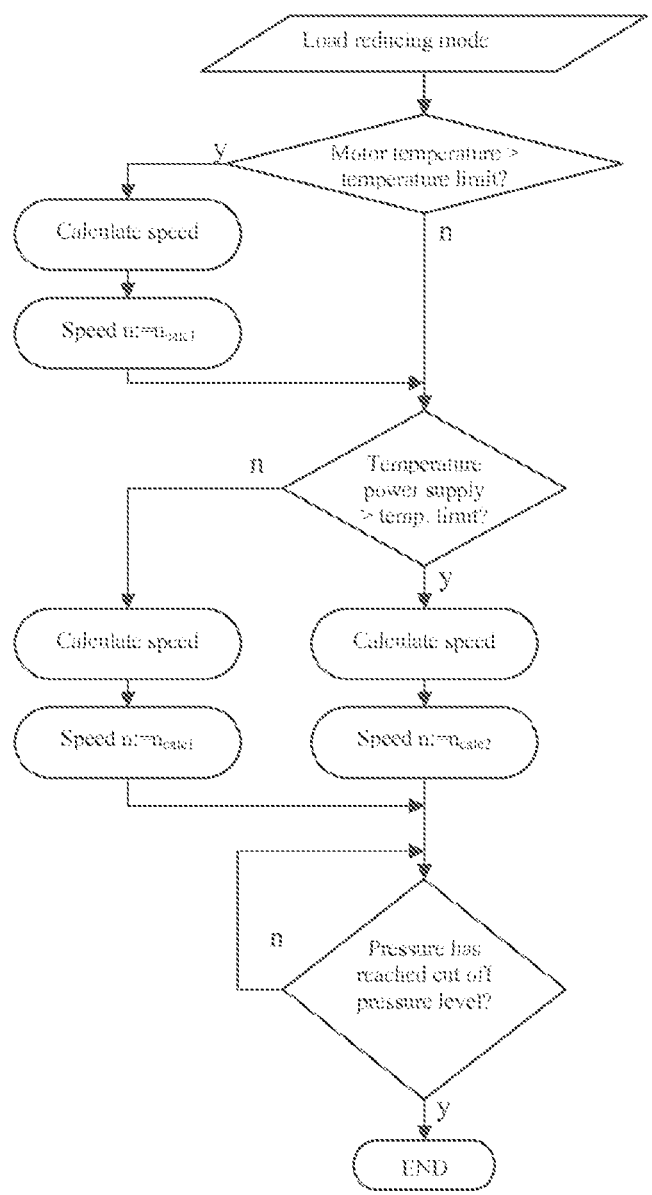
FIG. 11 is a flow chart illustrating a load reducing mode.

If the temperature of the electric drive motor 8, measured by the temperature sensor 26 and/or the temperature of the electric power supply 6, measured by the temperature sensor 25 exceeds a set temperature limit, respectively, the speed of the electric drive motor 8 of the compressor 9 is reduced. This process is illustrated in FIG. 11.

If the temperature of the electric drive motor 8 is above a set temperature limit, a reduced first speed $n_{calc1}$ of the drive motor 8 of the compressor 9 is calculated, reducing the load of the electric drive motor 8, which then is controlled to operate with this first calculated speed $n_{calc1}$. If, additionally, the temperature of the electric power supply 6, measured by temperature sensor 25, is above a set temperature limit, then the first calculated speed $n_{calc1}$ of the electric drive motor 8 of the compressor 9 will be recalculated to a second calculated speed $n_{calc2}$ which is lower than first calculated speed $n_{calc1}$. The electric drive motor 8 of the compressor 9 is controlled to run with the second calculated speed $n_{calc2}$ until the pressure in air system reservoir 11 reaches a set cut off pressure level.

11. Refresh Mode

Figure 12:
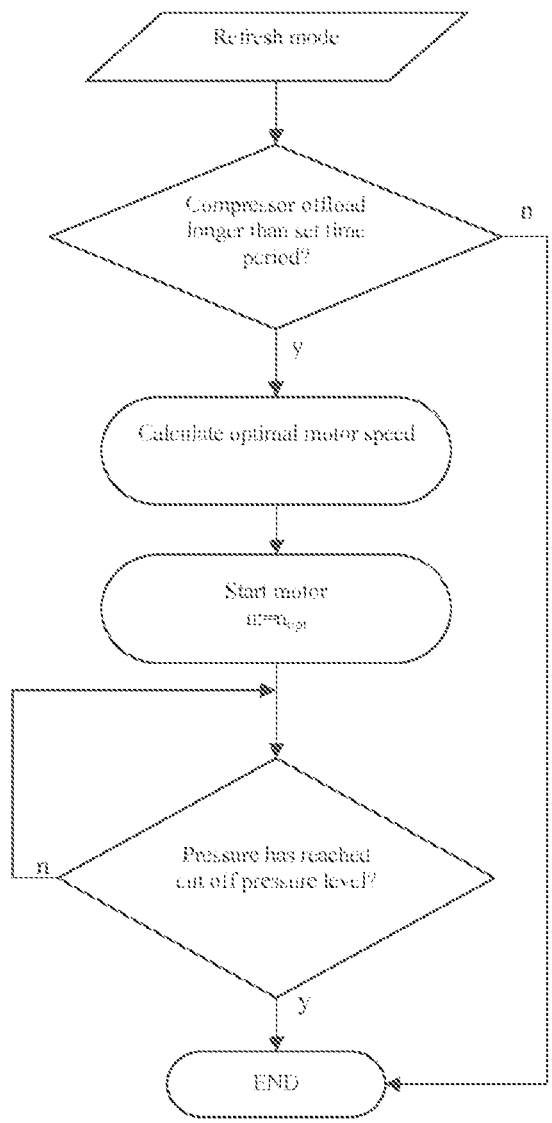
FIG. 12 is a flow chart illustrating a refresh mode.

In case, that the electric drive motor 8 of the compressor 9 is stopped for a predefined or set time period, the electric drive motor 8 of the compressor 9 is restarted to establish a lubrication refresh activity. This process is illustrated in FIG. 12.

If the electric drive motor 8 of the compressor 9 is in an offload mode for a time period longer than a set or predefined time period, the electric drive motor 8 is started and controlled to run or operate with a set or calculated speed until the pressure in air system reservoir 11 reaches a cut off pressure level.

12. Intermediate Regeneration Mode

Figure 13:
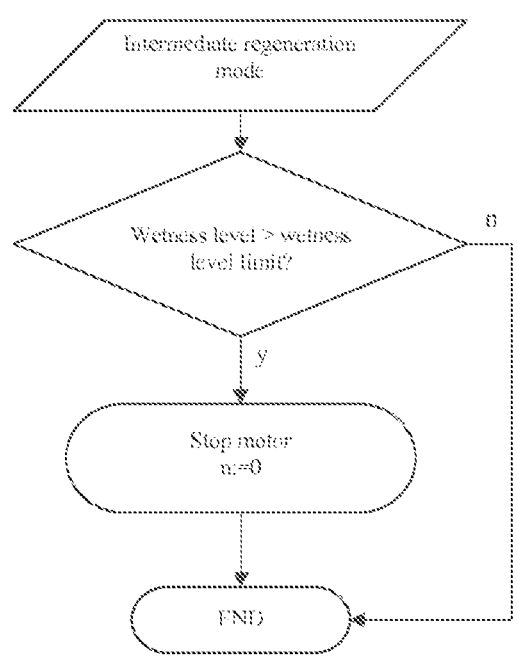
FIG. 13 is a flow chart illustrating an intermediate regeneration mode.

If the level of wetness in the air processing unit 10 and/or in the air system reservoir 11 exceeds a predefined or set wetness level, the electric drive motor 8 of the compressor 9 is stopped if the electric drive motor 8 is in a load mode and a regeneration phase has been started to decrease the wetness level in the air processing unit 10 or in the air system reservoir 11. This mode is illustrated in FIG. 13.

If the wetness level in the air processing unit 10 and/or in the air system reservoir 11 is above a predefined or set wetness level limit, the electric drive motor 8 of the compressor 9 is stopped.

13. Anti Freeze Mode

Figure 14:
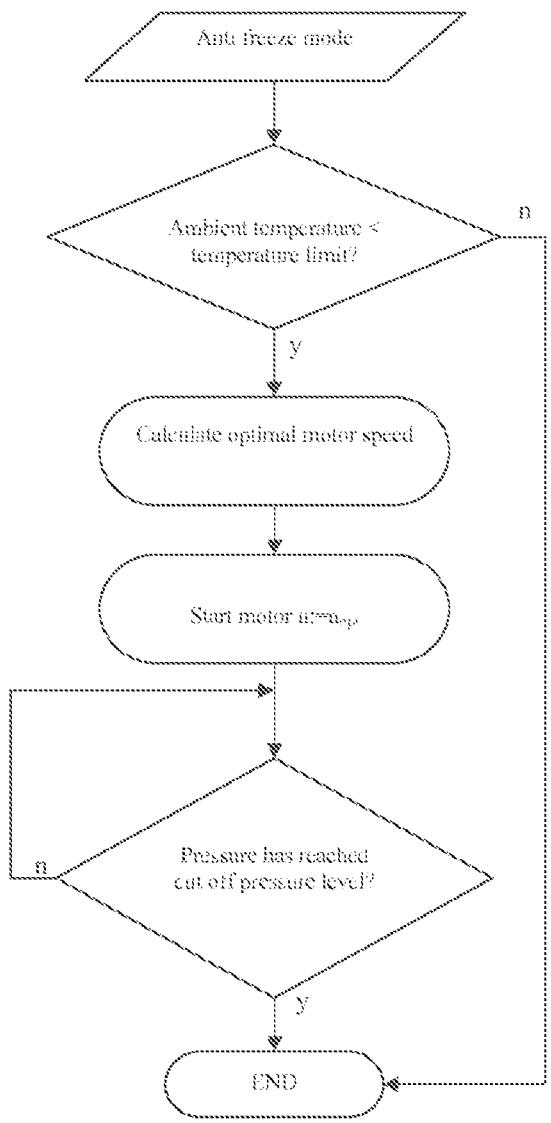
FIG. 14 is a flow chart illustrating an anti freeze mode.

If the ambient temperature is below a set or predefined ambient temperature level and the electric drive motor 8 of the compressor 9 is stopped during a predefined or set time period, the electric drive motor of the compressor 9 is started, to prevent freezing in a discharge line by delivering warm air into the discharge line by the compressor 9. This mode is illustrated in FIG. 14.

If the ambient temperature is below a set or predefined temperature, the electric drive motor 8 is controlled to start and operate with a set or calculated speed until the pressure level in air system reservoir 11 has reached a cut off pressure level.

With this, an off engine compressor drive is achieved to enable a high speed operation of the compressor even in case of idling drive engine 2, 4 of the vehicle. Thus, the compressor 9 can be made smaller. Further, power consumption is decreased, enabling to use a smaller battery and a longer battery lifetime.

14. Compressor Duty Mode

In compressor duty mode the onload timeframe of the compressor 9 is limited. Based on the pressure level signal and the onload time limit the required compressor speed is calculated. In duty control mode the air amount equivalent to the pressure difference between the cut off pressure level and the actual pressure level has to be fed by the compressor into the compressed air system. The air amount (mass-flow rate) is calculated as follows:

$$\frac{dm_{comp}}{dt} = \frac{dp}{dt} \cdot \frac{R_{air} \cdot T_{amb}}{V_{system}}$$

$$\frac{dm_{comp}}{dt} = \frac{p_{CUTOFF} - p_{system}}{t_{ONLINE\_LIMIT} - t_{ONLOAD\_ELAPSED}} \cdot \frac{R_{air} \cdot T_{amb}}{V_{system}}$$

Where $\frac{dm_{comp}}{dt}$ – air delivery of the compressor $p_{CUTOFF}$ – cut of pressure level $p_{system}$ – actual system pressure level $t_{ONLOAD\_LIMIT}$ – time limit of the on load phase $t_{ONLOAD\_ELAPSED}$ – elapsed time in on load phase $V_{system}$ – the total volume of the compressed air system $R_{air}$ – the specific gas constant of air $T_{amb}$ – the ambient temperature Based on the compressor flow-rate maps the compressor speed demand is calculated.

13

15. Noise Management

If the vehicle speed is below a predefined level, the noise of the vehicle should be reduced. In this case the compressor will be shut down, if the pressure level is not below a critical level.

If the pressure level is higher than the critical pressure level in the air system, the compressor speed is proportional to the vehicle speed based on a predefined function.

16. Critical Compressor Speed Avoidance

Critical compressor speed windows can be defined, which values are considered at compressor speed calculation. These compressor speed windows will be avoided to reduce noise, vibration and harshness.

The List of reference numerals is as follows:
1 vehicle
2 internal combustion engine
3 transmission
4 electric motor
5 generator
6 electric power supply
7 controller
8 electric drive motor
9 air system compressor
10 air processing unit
11 Air system reservoir
12 air brake system
13 air suspension system
14 pneumatic booster system
15 door opening system
16 driver seat air suspension
17 lubricating system for the compressor
18 cooling system for the compressor
19 electric power supply network
20 sensor
21 accelerator pedal
22 sensor
23 brake pedal
24 speed sensor
25 temperature sensor
26 temperature sensor
27 wetness sensor
28 current sensor
29 current sensor
30 voltage sensor
31 pressure sensor
32 ambient temperature sensor
33 speed sensor
100 air compressed system
200 air supply system
300 air utilizing system
400 driveline

The invention claimed is:

1. A compressed air system for a motor vehicle with an air supply system, comprising:
   an electric drive motor, which is controllable for variable speed;
   an air compressor coupled to be driven by the electric drive motor;
   an electric power supply to supply electric power to the electric drive motor;
   at least one air reservoir connected with the air compressor to receive air from the air compressor;
   an air utilization system connected to the at least one air reservoir to receive air from the at least one air reservoir;
   a controller to control the speed of the electric drive motor;

14 wherein the controller controls the electric drive motor to determine the speed of the electric drive motor depending upon at least one signal out of the following signals:
   a signal representing the activation status of an accelerator pedal of the vehicle,
   a signal representing the speed of the vehicle,
   a signal representing the temperature of the power supply,
   a signal representing the temperature of the electric drive motor,
   a signal representing the wetness level of the air compressed by the air compressor,
   a signal representing the load of the air compressor,
   a signal representing the running time of the air compressor,
   a signal representing the status of the electric power supply;
   wherein during filling of the air reservoir, when the pressure level in the air reservoir passes a setpoint that is between a minimum level and a higher cut off pressure level, the controller changes the compressor speed so that specific power consumption per unit mass of air compressed is decreased.

2. The compressed air system of claim 1, wherein in at least one interval of pressure in the air reservoir, the compressor speed is regulated by the controller so that a mass flow of air is delivered that is proportional to a ratio between (i) the difference between the cut off pressure level and the actual pressure in the air reservoir and (ii) the remaining time in the on load phase of the compressor.

3. The compressed air system of claim 1, wherein while the pressure in the air reservoir is above a minimum level, and wherein the controller transforms an increase in vehicle speed into an increase in compressor speed and/or transforms a decrease in vehicle speed into a decrease in compressor speed, according to a predefined function.

4. The compressed air system of claim 1, wherein the controller optimizes the compressor speed so as to avoid at least one pre-set interval of compressor speeds.

5. The compressed air system of claim 4, wherein compressor speeds in the pre-set interval are disallowed by the controller and/or penalized in a merit function that the controller uses to rate compressor speeds.

6. The compressed air system of claim 4, wherein when the controller changes the compressor speed from a first value on one side outside the pre-set interval to a second value on the other side outside the pre-set interval, the compressor is set to cross the pre-set interval of speeds at its maximum slew rate.

7. The compressed air system of claim 1, wherein the electric power supply, the controller and the electric drive motor are connected by an electric power supply network, and wherein the controller controls the electric drive motor to determine the speed of the electric drive motor depending upon a signal representing the status of the electric power supply network.

8. The compressed air system of claim 7, wherein the signal representing the status of the electric network) is the voltage and/or the conducted current.

9. The compressed air system of claim 1, wherein the speed of the electric drive motor is determined based upon at least one function and/or upon at least one look-up table, where at least one of the signals is an input variable for the at least one function and/or the least one look-up table.

10. The compressed air system of claim 1, wherein the speed of the electric drive motor is determined based upon the air consumption of the compressed air system of the vehicle.

11. The compressed air system of claim 1, wherein the speed of the electric drive motor is controlled by the controller so that (i) if the pressure level in the air reservoir is lower than a minimum level and if the power stage of the electric power supply reaches or exceeds a set power stage limit, then the electric drive motor is operated with its maximum speed until the pressure level in the air reservoir reaches a cut off pressure level, or (ii) if the pressure level in the air reservoir is below a set pressure limit and if the power stage of the electric power supply is below the set power stage limit, then the electric drive motor is operated with a speed between zero speed and its maximum speed, until the pressure level in the air reservoir reaches the cut off pressure level.

12. The compressed air system of claim 1, wherein the speed of the electric drive motor is controlled by the controller so that, if the pressure in the air system reservoir is below a set pressure limit, then the electric drive motor is controlled to operate with a speed calculated to cover the actual air consumption of the compressed air system, until the pressure level in the air reservoir reaches a set cut off pressure level.

13. The compressed air system of claim 1, wherein the speed of the electric drive motor is controlled by the controller so that, if the pressure in the air system reservoir is below a set pressure limit, then the electric drive motor is operated with a speed calculated to cover the current air consumption of the compressed air system, until the pressure level in the air reservoir reaches a cut off pressure level, which is higher than a normal cut off pressure level to store more energy in the compressed air system.

14. The compressed air system of claim 1, wherein the speed of the electric drive motor is controlled by the controller so that, if the power stage of the electric power supply is below a set power stage limit, or if the temperature of the electric drive motor exceeds a critical temperature limit, or if the actual speed of the electric drive motor is not equal to a demanded speed, then the electric drive motor will be stopped.

15. The compressed air system of claim 1, wherein the electric drive motor is controlled by the controller so that, if the compressor is switched offload and the actual speed of the electric drive motor of the compressor is higher than zero, the electric drive motor is operated in a generator mode to charge the electric power supply until a set or predetermined charge level of the electric power supply is reached.

16. The compressed air system of claim 1, wherein the electric drive motor is controlled by the controller so that, if an accelerator pedal of the drive engine of the vehicle is kicked down and the charge status of the electric power supply exceeds a set charge limit and the consumption of electric power is above a set consumption limit, than the electric drive motor of the compressor is controlled to operate with a calculated speed lower than its maximum speed until the pressure in the air system reservoir reaches a set cut off pressure level.

17. The compressed air system of claim 1, wherein the electric drive motor is controlled by the controller so that, if the ambient temperature is below a set ambient temperature, the electric drive motor is controlled to operate with a set calculated speed until the pressure level in the air system reservoir reaches a cut off pressure level.

18. The compressed air system of claim 1, wherein the electric drive motor is controlled by the controller so that, if the temperature of the electric drive motor is above a set temperature limit, a reduced first speed of the drive motor 8 of the compressor is calculated, reducing the load of the electric drive motor, which then is controlled to operate with this first calculated speed, and if, additionally, the temperature of the electric power supply is above a set temperature limit, then, the first calculated speed of the electric drive motor is recalculated to a second calculated speed which is lower than first calculated speed and the electric drive motor is controlled to operate with the second calculated speed, until the pressure in air system reservoir reaches a set cut off pressure level.

19. The compressed air system of claim 1, wherein the electric drive motor is controlled by the controller so that, if the electric drive motor is in an offload mode for a time period longer than a set or predefined time period, the electric drive motor is started and controlled to operate with a set or calculated speed until the pressure in the air system reservoir reaches a cut off pressure level.

20. The compressed air system of claim 1, wherein the electric drive motor is controlled by the controller so that, if the wetness level in the air system reservoir is above a predefined or set wetness level limit, the electric drive motor of the compressor is stopped.

21. The compressed air system of claim 1, wherein the electric drive motor is controlled by the controller so that, if the ambient temperature is below a set or predefined temperature, the electric drive motor is controlled to start and run at a set or calculated speed until the pressure level in air system reservoir has reached a cut off pressure level.

* * * * *